Aug. 6, 1935.    R. W. ATKINSON    2,010,530
ELECTRICAL INSTALLATION
Filed May 8, 1930    3 Sheets-Sheet 1
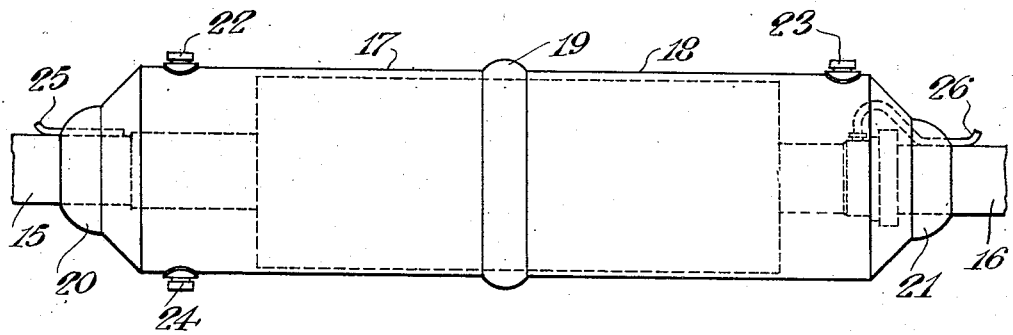
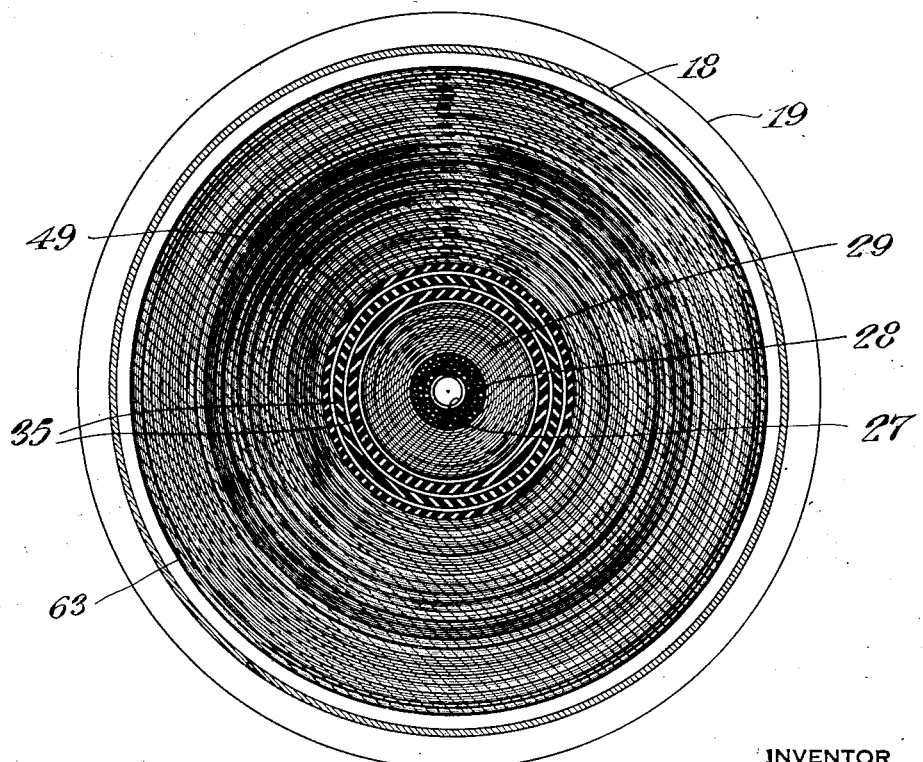
INVENTOR
Ralph W. Atkinson
BY
Emery, Booth, Varney & Whittemore
ATTORNEYS

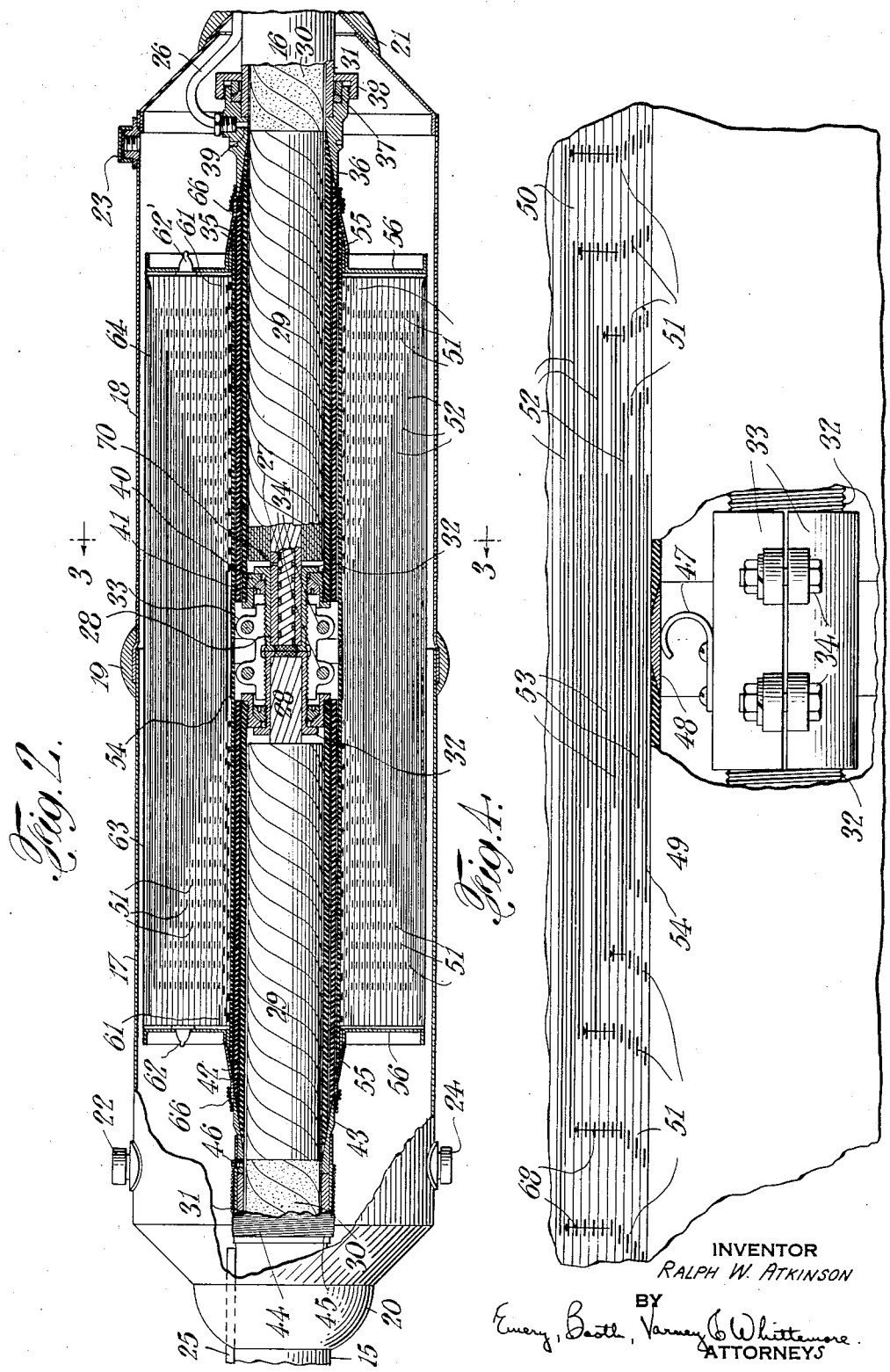

Aug. 6, 1935.      R. W. ATKINSON      2,010,530
ELECTRICAL INSTALLATION
Filed May 8, 1930      3 Sheets-Sheet 3
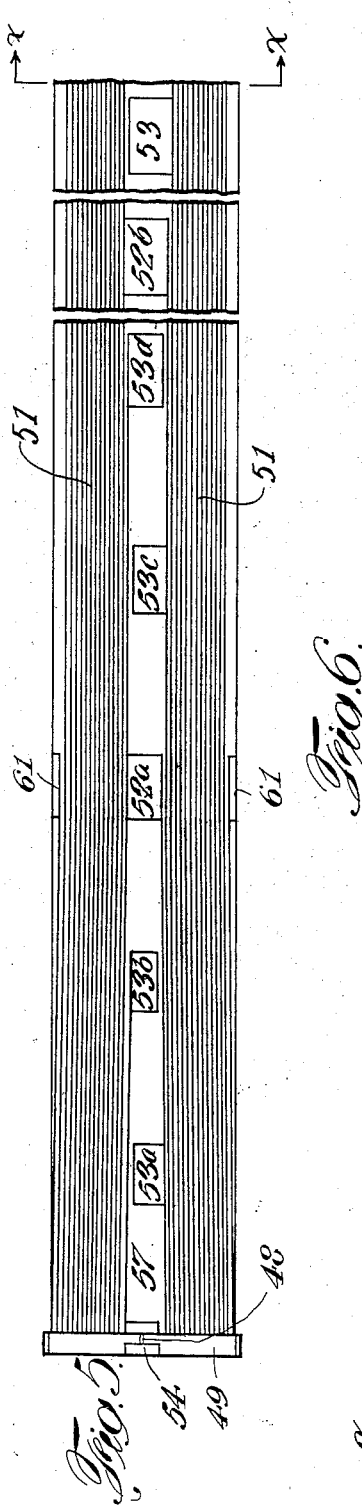
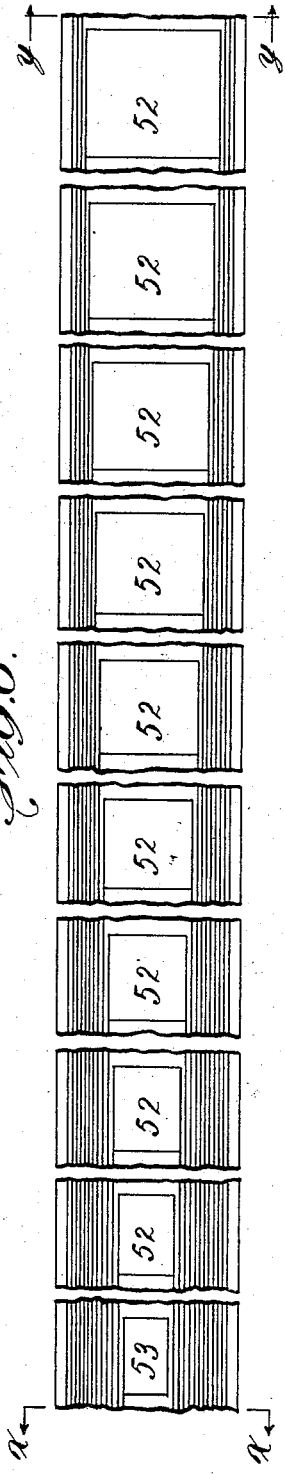
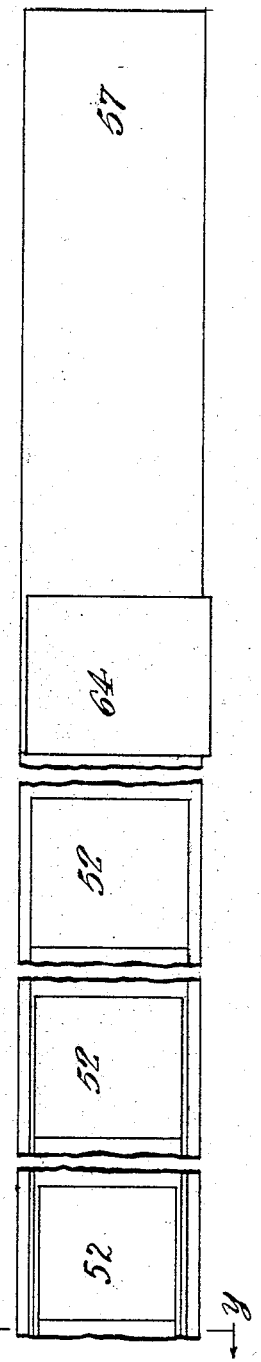
INVENTOR
Ralph W. Atkinson
BY Emery, Booth, Varney
Whittemore
ATTORNEYS Patented Aug. 6, 1935

2,010,530

UNITED STATES PATENT OFFICE 2,010,530

ELECTRICAL INSTALLATION

Ralph W. Atkinson, Perth Amboy, N. J., assignor to General Cable Corporation, New York, N. Y., a corporation of New Jersey Application May 8, 1930, Serial No. 450,695

34 Claims. (Cl. 173—268)

This invention relates to high-voltage electrical installations, and more particularly to the insulation thereof. It is an object of this invention to provide an improved arrangement for preventing electrical breakdown through or along the surface of insulation separating the high-voltage conductor of such an installation and an encircling conductor of lower voltage, and more particularly to provide improved terminal and joint constructions for sheathed cables. Other objects and advantages of the invention will appear hereinafter.

An embodiment of the invention selected for purposes of illustration is shown in the drawings forming a part hereof, and in which:

Fig. 1 is a side view of a cable joint;

Fig. 2 is a longitudinal section of the cable joint to enlarged scale;

Fig. 3 is a transverse section of the cable joint substantially on line 3—3 of Fig. 2;

Fig. 4 is a fragmentary view to enlarged scale of the central portion of the joint shown in Fig. 2; and Figs. 5, 6 and 7, placed end to end, comprise a schematic showing to greatly reduced scale of the arrangement of the component parts of the insulating sleeve for the cable joint.

The advantages of transmitting and distributing electrical energy at high voltages have been recognized for a long time. The problems involved in insulating high-voltage systems, and particularly in jointing and terminating sheathed cables, have become exceedingly difficult of solution as the voltage has been increased, and new problems have arisen in connection with the jointing and terminating of oil-filled cables. This invention provides, among other things, improved joint and terminal constructions for high voltage cables and for oil-filled cables.

Referring to Fig. 1, two sheated cable lengths 15 and 16 have their ends united within a joint casing, the joint casing conveniently being of metal and comprising two aligned cylindrical shells 17 and 18 joined at their adjacent ends as by means of a telescoping and wiped solder joint 19, and having their other ends reduced in size and joined to the sheaths of the cable lengths 15 and 16, as by means of wiped solder joints 20 and 21.

The joint casing may be provided with one or more openings such as 22, 23 and 24 for convenience in flushing and filling the casing with a fluid insulating material, for example oil, and for draining the insulating material from the casing in the event that such a step becomes necessary. Conveniently the openings 22, 23 and 24 are provided with means such as removable screw caps for effecting fluid tight closure.

In the event that the cable is liquid-insulated cable, i. e. cable in which the conductor is spaced from an impervious surrounding sheath, as by means of a body of porous insulation, and the space and the spacing medium are filled or flushed with a liquid insulating material, for example an oil, suitable connections may be made for supplying liquid insulating material to the joint and terminal casings and to the cable lengths. Ordinarily it will be satisfactory if each cable length is supplied with oil from one end only. Conveniently there may be a passageway for the free exchange of oil between a joint casing and one of its cable lengths, but preferably the joint construction substantially prevents any direct flow of oil from one cable length to an adjacent cable length. For example, oil may be supplied by means of pipes 25 and 26 entering the joint casing at its ends through the wiped solder joints 20 and 21. Alternatively, such connections for the insulating material might be made through one or more of the openings 22, 23 and 24. Herein, liquid-insulated cable as above-defined is referred to as oil-filled cable.

Referring to Figs. 2 and 3, the cable shown, merely by way of illustration, is hollow-core, oil-filled cable. A central spiral coil 27, which may be of spring steel, supports the spiralled conducting strands 28 which constitute the cable conductor. The spiral coil 27 defines a conduit permitting freer circulation of oil longitudinally of the cable, and the assembly of the parts comprising the hollow-core conductor preferably will be such as to permit migration of the oil with which the cable is filled through the wall of the conductor between the conduit defined by the spiral coil 27 and the insulation 29 which spaces the conductor from the cable sheath 31. The spiral coil 27 also increases the external surface of the conductor, thereby reducing the concentration of stress on the inner surface of the surrounding insulation 29. The insulation 29 may be wrapped-on paper filled with oil. To further insure free circulation of oil longitudinally of the cable, additional oil channels may be provided between the insulation 29 and the sheath 31, and conveniently the sheath 31 may be fluted interiorly. A cable having these characteristics is disclosed in United States Letters Patent No. 1,574,076, granted February 23, 1926, on an application of Henry W. Fisher.

In the cable shown, again merely by way of illustration, the insulated conductor is immediately surrounded by a snugly-adherent, permeable, metallic envelope 30 which preferably is at or near ground potential. This conducting envelope shields the insulated conductor, effectively distributing and limiting the electrical stress. In lead sheathed cable the lead sheath ordinarily is in direct contact with the shielding envelope substantially throughout the length of the cable, whereby the shielding envelope will be at the same potential as the lead sheath. Such a cable construction is disclosed in United States Letters Patent No. 1,199,789, granted October 3, 1916, on an application of Martin Hochstadter.

Fig. 2 shows in section, and to larger scale than Fig. 1, the adjacent ends of the two lengths of cable 15 and 16 jointed and provided with an arrangement constructed in accordance with this invention for preventing electrical breakdown within the joint. The ends of the cable lengths, sealed after manufacture, have been opened and prepared for jointing by cutting away the insulation 29, metallic envelopes 30 and sheaths 31 to successively greater distances, leaving the conductors 28 exposed at the ends of the cable lengths.

Secured to each of the exposed conductor ends, as by soldering, is means exemplified as an exteriorly threaded thimble 32, whereby the cable conductors may be easily united within the joint casing. These thimbles and the solder with which they are secured to the conductor ends preferably form oil stops to prevent any flow of oil out through the ends of the stranded conductors 28 or the conduits defined by the spiral coils 27.

Surrounding each of the cable ends within the joint casing is an oil cap joined substantially fluid-tight to the thimble 32 and to the cable sheath 31. Preferably, such oil cap on the cable end comprises a rigid wall or tube of insulating material surrounding at a narrow interval the body of cable insulation 29 from which the metallic envelope 30 and the sheath 31 have been removed. The wall of insulating material may take the form of two or more concentric rigid tubes separated one from another by a thin layer of oil. As shown, the oil cap 35 on the cable end 16 comprises two such concentric insulating tubes. If desired, one or more holes 70 may be drilled through the conductor wall 28 adjacent the end of the cable insulation 29 to provide for more rapid flow of oil between the interior of the conductor and the interior of the oil cap 35.

The tubes 35, or at least one of them, is connected in substantially oil tight union to the cable sheath 31 in any suitable manner, for example, by means of a bushing 36, conveniently of brass, and having substantially oil-tight engagement with the ends of the tubes 35. As shown, the bushing 36 is interiorly shouldered, and abuts and overlies the end of the cable sheath 31. Mechanical union and oil-tight engagement between the bushing and the sheath 31 conveniently may be secured by means of a packing ring 37 firmly compressed between the bushing 36 and the sheath 31, as by means of a collar 38 having screwthreaded engagement with the bushing 36.

If desired, oil may be supplied to the interior of the capped cable length 16 by means of an opening 39 through the wall of the bushing 36, for example, by connection with the pipe 26 previously referred to. If oil is supplied to the cable length 16 from its distant end through an adjacent joint or terminal the opening 39 conveniently may be closed by means of a plug.

The tubes 35, or at least one which is connected oil-tight to the cable sheath, at its opposite end is secured in substantially oil-tight union upon the thimble 32 in any suitable manner. As shown, such oil-tight union is made with the inner tube 35. The thimble 32 and the inner tube 35 are adjacently screwthreaded, the one over its external and the other over its internal surface. An exteriorly threaded nut 40 is screwed into the end of the inner tube 35, and an interiorly threaded nut 41 is screwed onto the end of the thimble 32. Conveniently the inner edge of the nut 40 and the outer edge of the nut 41 overlap and have complementary tapered surfaces so that when they are drawn tightly together by turning down the nut 41 their surface of contact forms a substantially oil-tight seal.

Thus it will be seen that the end of the cable length 16 is provided with a cap through which the conductor 28 is electrically accessible, but which substantially seals the end of the cable length against ingress or egress of oil except as desired through the opening 39 and the pipe 26.

The end of the cable length 15 also is provided with an oil-cap, which cap may be generally similar to the cap applied to the end of the cable length 16. It may be desirable, for reasons which will appear hereinafter, to use a slightly different method of connecting the insulating cap to the sheath 31 of the cable length 15. As shown, rigid insulating tubes 42, similar to the tubes 35, have substantially oil-tight union with one end of a bushing 43. The other end of the bushing 43 is reduced to approximately the same diameter as the cable sheath 31. A thin, flexible ring 44, conveniently of brass is slipped on to the reduced end of the bushing 43 and secured thereto in any suitable manner, as by soldering. The unit comprising the ring 44, bushing 43, and tubes 42 is slipped on over the exposed cable insulation 29, until the end of the bushing 43 abuts the end of the cable sheath 31, this connection being reinforced mechanically by the portion of the ring 44 which closely overlies the end of the cable sheath.

Since, in the particular embodiment shown, it is desired to have a passageway for the flow of oil between the interior of the cable length 15 and the interior of the joint casing after the joint is completed, the connection between the bushing 43 and the sheath 31 need be only sufficiently oil-tight to prevent such an outflow of oil from the cable during the jointing operation as might injure the cable insulation or seriously impede the joint-making operation. Conveniently, such a joint is produced by a thin, tight wrapping 45 of cord or tape over and around that portion of the ring 44 which overlies the cable sheath 31, so as to bind the ring 44 tightly on the cable sheath. Alternatively, the ring 44 may be united with the cable sheath by means of a wiped solder joint.

Conveniently the bushing 43 has an opening therethrough, which opening normally is closed during the jointing operation, as by means of a screwthreaded plug 46. This plug 46 may be removed through the opening 22 in the joint casing upon completion of the joint in order to provide a passageway for the interflow of oil between the cable length 15 and the joint casing. Oil may be supplied to the cable length 15 and to the joint casing, for example, by means of the pipe 25 opening directly into the joint casing.

The other ends of the tubes 42, or one of them, may be secured in oil-tight union upon the thimble 32, conveniently in a manner similar to the connection for the cable length 16.

The ends of the conductors of the two cable lengths, electrically accessible through the oil caps by means of the thimbles 32, are electrically united in any suitable manner, for example, by means of a split collar 33, preferably of copper and interiorly threaded, which may be clamped in place around the abutting ends of the thimbles 32, as by means of screws 34.

The cable and joint thus far described have been chosen to illustrate one application of the insulating and stress distributing arrangement hereinafter described in more detail, but it will be understood that the invention is applicable to numerous other constructions and situations.

If the cable joint as described above is to be used for high voltages, and the dimensions of the joint are to be kept within practical limits, it will be necessary to provide some means for distributing the electrical stress between the conductor joint and the ends of the cable sheaths 31, as well as to insulate the conductor joint from the joint casing 17—18. If some suitable stress distributing means is not employed there will be high concentrations of stress, for example at the square cut ends of the cable sheaths 31 and/or at the edges of the bushings 36 and 43, which may result in the breakdown of the joint.

The stress distributing means disclosed in this application is in the nature of an improvement over the arrangements disclosed in applicant's copending applications Serial No. 119,898, filed July 1, 1926, patented July 26, 1932, No. 1,868,962, and Serial No. 261,091, filed March 12, 1928.

Again referring to the drawings for a disclosure of one suitable embodiment of insulating and stress distributing means contemplated by this invention, and particularly to Fig. 4, the collar 33 has a radially extending contact member 47, conveniently in the form of a spring. The contact member 47 makes frictional electrical contact with a metallic member 48, which member is embedded in and transfixes a rigid insulating tube 49 substantially midway of its length. Conveniently the member 48 is in the form of a ring, and the tube 49 is in two sections, these sections being suitably secured in aligned oil-tight union with the ends of the ring 48. The tube 49 surrounds at a narrow interval the tubes 35 and 42 of the cable caps, and preferably substantially spans the interval between the bushings 36 and 43. Electrically continuous with the member 48 and surrounding the tube 49 is a thin cylindrical conducting shell 54. This shell 54 forms the inner of the equipotential shells described in the following paragraphs, and, as will appear hereinafter, its length is determined by the capacity requirements and by the other dimensions of the insulating structure. Conveniently the dimensions of the parts are so designed that this shell 54 substantially spans the interval between the adjacent ends of the insulating tubes 35 and 42.

Formed around the tube 49 and the shell 54 is a thick wall of insulating material 50 comprising with the tube 49 a sleeve for insulating the conductor joint from the joint casing. Embedded in this insulating sleeve are means providing a plurality of conducting surfaces arranged to distribute the electrical stress throughout the insulating sleeve and by zones longitudinally along the exposed portions of the cable insulation in accordance with a predetermined plan, so as to prevent a dangerous concentration of stress with a resultant breakdown at any point within the joint casing.

As shown in Figs. 2, 3 and 4, these conducting surfaces form a series of equi-potential shells surrounding the conductor joint. While the contour of these shells may be made in any convenient form, in the embodiment disclosed they consist of a nest of concentric substantially cylindrical conducting plates 52 and, adjacent to the ends thereof and electrically continuous therewith, a plurality of conducting screens 51 embedded in the wall of insulating material 50 and surrounding and spaced along the tube 49 between the ends of the tube and the conducting shell 54. The number of these shells, the dimensions of the conducting plates, the shapes and dimensions of the screens, and the spacing of the screens along the tube 49 will be determined in large part by the distance and the difference in potential between the exposed cable conductor and the sheath, the thickness of the cable insulation 29, the nature of the insulation 29 and 50, and the distribution of stress which is desired.

For convenience in describing the invention the word "width" is used to describe the extent or projection of a screen on and longitudinally along the surface of the exposed cable insulation. By the "spacing interval" between screens is meant the spacing interval extending longitudinally of the cable between the projections of the screens on the cable.

The potentials of the series of equi-potential shells vary progressively between the limits of the potentials of the cable sheaths and the conductor joint. Conveniently, although not necessarily, the stress distributing means is designed so that the potential difference between adjacent shells is uniform. It will be apparent that the screens near the conductor joint are at a potential relatively nearer that of the cable conductor than are the screens adjacent the ends of the cable sheaths. Consequently, the voltage and the electrical stress between the cable conductor and the screens adjacent the cable sheaths will be greater than the stress between the conductor and the screens adjacent the conductor joint, and the danger of a harmful concentration of stress will be greater adjacent the ends of the cable sheaths than it will be near the center of the cable joint.

Preferably, the spacing intervals between adjacent screens 51 near the ends of the cable sheaths are severally small in comparison to the radial thickness of the cable insulation 29 from the outer surface of the conductor 28 to the inner surface of the sheath 31, and the screens adjacent the cable sheaths are of a width greater than the adjacent spacing intervals. With such a construction the stress between the cable conductor and the screens is distributed more uniformly, and a dangerous concentration of stress may be more easily avoided. If the screens have a flaring form they may even overlap longitudinally of the cable, in which case the spacing interval becomes zero, the screens being electrically insulated from each other because of the radial spacing between adjacent edges due to their flaring form.

Preferably the screens 51 surrounding each of the joined cable ends flare outwardly toward the conductor joint, whereby the stress between adjacent screens and between the screens and cable conductors may be distributed so as to prevent a dangerous concentration at the edges of the screens. The local potential distribution between adjacent screens longitudinally along the tube 49, and between the several screens and the cable conductor is in part determined by the angle relative to the longitudinal axis of the cable joint at which the screens flare outwardly from the tube 49.

The numerical value of the preferred angle for any screen is a function of the radius of the tube 49, of the ratio between the outer diameters of the tube 49 and the conductor 28, and of the desired distribution of potential along the tube. These angles for the screens conveniently will be selected to give approximately uniform stress distribution between adjacent screens longitudinally along the surface of the tube 49.

With a given difference of potential between the cable conductor and the cable sheath, any point P on the surface of the tube 49 radially under one of the screens 51 and at a longitudinal distance $y$ from the origin of the screen at the surface of the tube will assume a potential between that of the screen and that of the conductor 28. The ratio of the potential difference between the screen 51 and the point P to the potential difference between the point P and the conductor 28 will tend to be in inverse proportion to the ratio of the respective capacitances.

If $V$ represents the total difference in potential between the screen and the conductor, $v$ the difference in potential between the screen and the point P which will give the desired potential distribution, $C$ the capacitance between the conductor and the point P, and $c$ the capacitance between the screen and the point P, then approximately:

$$\frac{v}{V-v}=\frac{C}{c}. \qquad (I)$$

If the insulating material between the screen and the point P has the same dielectric constant as the insulation between the point P and the conductor 28, the capacitance $C$ between the conductor and the point P may be calculated by applying the standard formula for the capacitance between two co-axial cylinders, the inner cylinder comprising a short length $dw$ longitudinally of the tube 49 at the point P. Representing the radius of the conductor 28 by $r$, the radius of the external surface of the tube 49 by $R$, and the radial distance from the point P to the screen by $x$, then:

$$C=\frac{Kdw}{\log \frac{R}{r}}, \qquad (II)$$

and similarly $$c=\frac{Kdw}{\log \frac{R+x}{R}}, \qquad (III)$$

where $K$ is a constant dependent on the dielectric permittivity of the insulating materials, and the units used.

Substituting II and III in I:

$$\frac{v}{V-v}=\frac{\log \frac{R+x}{R}}{\log \frac{R}{r}}; \qquad (IV)$$

20 and solving:

$$x=R\left[\left(\frac{R}{r}\right)^{\frac{v}{V-v}}-1\right] \qquad (V)$$

The plane angle $\theta$ between the screen 51 and the tube 49 will be the angle whose tangent is $$\frac{x}{y}$$

Values for $x$ may be calculated for various points along the tube 49, under each of the screens 51, whereby the preferred angles of the flare of the several screens may be ascertained.

The calculated angles of flare of the several screens increase progressively from the end of the cable sheath toward the conductor joint, and the calculated angle of flare of each individual screen increases slightly from its smaller diameter edge to its larger diameter edge. If the width of the screen is not too great, and ordinarily it will not be, this calculated change of angle across the width of any one screen is so small that for practical purposes it may be neglected, and conveniently the angle of flare remains constant for any one screen and may be determined by calculating for $x$ at one point on the screen near its larger diameter edge.

For convenience in construction several screens may be made with the same flare, the angle increasing by groups of screens from the end screens near the cable sheaths toward the shell 54. Conveniently the widths of the several screens may decrease progressively or by similar groups, and the widths of the spacing intervals between adjacent screens increase from the end screens toward the shell 54. Preferably the smaller diameter edges of the screens are substantially equally spaced along the tube 49. Adjacent the conductor joint the angle of flare of the screens approaches a right angle, and the spacing intervals may become much greater than the widths of the adjacent screens.

Where the widths of a screen 51 and the angle of flare are such that the larger diameter of the flaring screen is less than the diameter of the corresponding cylindrical plate 52, any suitable means may be provided for establishing electrical connection between the screen 51 and the end of the cylindrical plate 52. Conveniently, and preferably, this connection is made by increasing the angle of flare of the screen relative to the tube 49 at the larger diameter edge of the screen to 90°, and by extending the screen radially to the end of the cylindrical plate.

The equi-potential shells above described constitute a nested series of co-axial conducting plates 52 having reduced end portions 51, and enclosing the joined cable ends. The relative potentials of the shells will depend on the proportioning of the capacitances between adjacent shells. These capacitances and the corresponding potential differences are determined in large part by the spacing between the cylindrical plates 52 and by the dimensions of the plates.

Practically, the maximum dimensions of the plates are limited by the permissible size of the cable joint, and consequently the capacitances between plates ordinarily will be largely fixed by the separation between plates. The capacitances necessary for any desired potential distribution may be calculated, and the separation between plates to provide these capacitances may be determined by use of known equations, the necessary corrections being made in each case for the effect of the parallel capacitance between each of the screens 51 and the cable conductor.

In order to obtain a substantially uniform distribution of potential longitudinally along the exposed portion of the cable insulation, the inner edges of the flaring screens 51 conveniently are equally spaced along the tube 49, and the potential differences between each pair of screens are substantially equal. This result conveniently may be accomplished by progressively increasing the thickness of insulation between adjacent cylindrical plates 52 as the diameters of the plates increase. For this reason the thickness of insulation between the inner shells preferably will be made as thin as will provide sufficient dielectric strength. Since the proportionate strength of the insulating material is increased as its thickness is decreased, some advantage is gained by reducing the potential steps in this region by reducing the spacing between screens.

If the capacitances between adjacent screens cannot be sufficiently increased for a given length of insulating sleeve and cable joint without reducing the separation between plates to a dangerous value, additional capacitances conveniently may be provided, (Fig. 4) as by means of one or more sets of cylindrical plates 53 interleaved between the equipotential screens and connected to the screens 51 at one end only so as to constitute with the corresponding screens a multiple plate condenser. It will be apparent that with such a construction considerably greater capacitance may be obtained between screens for a given length of joint without dangerously reducing the spacing between plates.

As may be seen in Fig. 2, the two screens 51 adjacent the ends of the tube 49 also are adjacent the ends of the insulating wall 50, and at their smaller diameter edges may be made electrically continuous, as by soldering, with tapered conducting rings 55 which closely overlie the ends of the tube 49. Conveniently the two screens 51 adjacent the ends of the tube 49 also may be connected at their larger diameter edges to the rings 55, as by means of connections 61 extending longitudinally out through and radially inwardly along the ends of the wall 50 of insulating material.

The screen 51 at each end of the insulating wall 50 preferably will be connected electrically with the adjacent cable sheath end. Conveniently these connections may be made by bridging conductors extending between the rings 55 and the bushings 36 and 43, for example wrappings 66 of wire screen which may be soldered to the rings 55 and the bushings 36 and 43.

The construction thus far described is illustrative of one application of the invention, wherein an improved cable joint is provided. The electrical stress between the conductor joint and the ends of the cable sheaths is distributed longitudinally and radially in such a manner that a harmful concentration is avoided at all points, and an insulating and stress-distributing structure is provided which permits the building of a joint having small dimensions, but capable of withstanding very high voltages.

The insulating sleeve conveniently may be constructed by building up the insulating wall 50 from a wrap 57 of insulating material, (Figs. 5 to 7) such as paper, which is tightly wrapped in spiralled overlying layers around the insulating tube 49, and by intercalating with the paper during the wrapping operation accurately proportioned and positioned means providing a plurality of conducting surfaces forming the conducting screens 51 and the conducting plates 52 and 53. Conveniently the conducting means may be strips and plates of metallic foil wrapped in with the paper.

Figs. 5, 6 and 7, when placed end to end in the manner indicated in the drawings, form a schematic showing to reduced scale of the insulating sleeve for the joint shown in Figs. 2 to 4, as this sleeve would look if unrolled, sections of the wrap 57 and conducting strips being removed between the broken lines in order to reduce the space required for the showing. If the tube 49 is rolled to the right, and the wrap 57 of insulating material is wrapped on the tube, it will be apparent that the narrow conducting strips 51 extending along the wrap 57 build up in overlying spirals to form the conducting screens 51 as the shell 54 is overlaid with a plurality of spiralled layers of the insulating wrap 57. Also it will be apparent that the flare of the screens 51 is determined by the angle between the conducting strips 51 and the longitudinal axis of the wrap 57, and the angle of flare may readily be changed by controlling the positioning of the strips 51 relative to the wrap 57.

When the conducting plate 53a is reached, this layer assumes the form of a substantially cylindrical shell with its longitudinal edges separated by the thickness of the wrap 57. It will be apparent that as the wrapping operation progresses the narrow strips 51, and the conducting plates 52 and 53 assume the forms of the screens 51 and the substantially cylindrical plates 52 and 53, as shown in Figs. 2 to 4.

In building the insulating sleeve it may be impractical to lay the wrap 57 out in its full length and to position all of the foil strips and layers on the wrap, as shown diagrammatically in Figs. 5 to 7, or to metallize portions of the wrap. The same result may be accomplished by wrapping the insulating wrap 57 on the tube 49 directly from a supply roll, and by feeding in with suitable guiding means strips and plates of metallic foil from separate supply rolls.

The angle of flare of the screens 51 will be determined by the angle at which the narrow strips 51 of foil are fed into the sleeve during the wrapping operation. When a screen 51 reaches the desired width, the spiral wrapping 51 may be continued in a plane perpendicular to the axis of the sleeve until the screen attains the predetermined diameter of its conducting plate 52 or 53, at which time one of the relatively wide plates of foil is intercalated in the wrapping to form the cylindrical plate 52 or 53 having one or both of its ends in electrical continuity with the corresponding screen or screens 51 on the tube 49. While the wrap 57 may comprise a single layer of insulating material, it will be obvious that the wrapping operation may be simplified and shortened by using a multi-layer wrap 57.

In the case of the larger diameter screens 51 the reactance of the long spiral paths from the outer edges of the flared portions of the screens to the plates 52 may be so great that when subjected to high frequency surges they will fail to act as continuous screens, and large differences in potential may be built up between the flared portions and the cylindrical plates. This danger may be overcome by shortening the electrical paths from the outer edges of the flared portions of the screens to the cylindrical plates 52 by short-circuiting the turns or layers of the screens, as by driving copper nails 68 radially of the sleeve and through the overlying spiralled layers forming the radial portions of the several screens 51. (Fig. 4.)

For convenience in building the cable joint in the field it may be desirable in some instances to assemble the joint insulating and stress-distributing structure, including the tube 49, the wall of insulation 50, the embedded conducting surfaces 51, 52, 53 and 54, and the end rings 55 as a unitary sleeve at the factory. Conveniently, this sleeve may be suitably impregnated at the factory with insulating compound, and transported to the field where it may be merely slipped into place over the cable ends without the necessity of reimpregnation. The advantages of such an arrangment are manifold. By assembling the insulating sleeve in the factory, where adequate machinery and space are available, it is possible to build a sleeve which meets exacting requirements, and which may, if desired, be given a high voltage test before installation. Merely for convenience in description the joint insulating and stress-distributing structure is referred to herein as an insulating sleeve.

Figs. 2 and 3 show one suitable form of insulating sleeve which may be constructed and impregnated at the factory, and installed without the necessity of reimpregnation. Secured in fluid-tight union on the ends of the insulating tube 49 are flanged disks 56 which protect the ends of the insulating and stress-distributing sleeve from injury. The flanged disks 56 may be of either conducting or non-conducting material, but conveniently are of sheet copper, and are electrically continuous with the rings 55. The disks 56 conveniently have pipe connections 62 and 62' for evacuating and impregnating the insulating sleeve with fluid insulation as hereinafter described. Surrounding the wall 50 of insulation is an impervious jacket 63, for example of sheet copper, which is connected in fluid-tight and electrical union at its ends to the outer edges of the disks 56. Thus the jacket 63 is electrically continuous with the two end screens 51 and the cable sheaths 31.

It will be apparent that the wall 50 of insulating material is completely enclosed within a fluid-tight enclosure formed by the tube 49, disks 56, and jacket 63, whereby the insulating sleeve may be treated in any desired manner to eliminate air, moisture and voids, and then may be sealed up to insure maintenance of the integrity of the insulation during transportation to the point of installation.

Referring to Fig. 2, there preferably is intercalated in the wall 50 of insulating material, surrounding and suitably insulated from the outermost plate 52, a plate 64 which is generally similar to the plates 52. The plate 64 terminates at one end adjacent or slightly short of the end of the wall 50, and at its other end projects beyond the wall 50 and is secured, as by soldering, in the joint between the end disk 56 and the outer jacket 63.

Without limiting the invention in any way, one suitable method of treating the insulating sleeve will be described. Conveniently, this treatment of the insulating sleeve may be effected by drying the sleeve in an evacuated chamber for several hours after the wrapping has been completed, but before the end disks 56 have been put in place. The end disks 56 then are positioned on the ends of the sleeve and the fluid-tight enclosure for the sleeve is completed. The sleeve may then again be heated in an evacuated chamber, thereby removing most of the air and moisture which may have been in the sleeve. Preferably the sleeve is then heated and evacuated from both ends through the pipes 62 and 62', and if desired the sleeve may be flushed out with a suitable inert gas such as hydrogen to insure removal of substantially all air and moisture. After the flushing gas has been evacuated, a suitable impregnating fluid, such as oil, is fed into the sleeve through the pipe 62 while a vacuum is maintained on the pipe 62'. The oil is forced longitudinally through the wall 50, thoroughly impregnating the paper insulation. The plate 64 being sealed at one end between the jacket 63 and an end disk 56, prevents the direct flow of oil longitudinally of the sleeve between the wall 50 and the jacket 63, thereby insuring complete penetration of all parts of the wall 50 by the oil.

When the impregnating process has been completed the pipes 62 and 62' are sealed. The completed sleeve is then ready to be tested and shipped to the point of installation. The integrity of the insulation of the sleeve may be maintained during shipment in any suitable manner, as by connecting to the pipes 62 or 62' an expansible oil reservoir, and/or enclosing the sleeve in an oil-filled shipping container.

The operation of assembling the joint shown in the drawings may be as follows:—The adjacent ends of the cable lengths 15 and 16 are cut off to the proper length, and the oil caps are applied in the manner previously set forth, suitable precautions being taken to maintain the integrity of the cable insulation during these operations. With the cable ends 15 and 16 capped, and the oil openings through the bushings 36 and 43 closed, as by means of screw plugs, the cylindrical shells 17 and 18 which are to form the joint casing are slipped on over the ends of the respective cable lengths. The insulating sleeve then is slipped on over the end of the cable 15, and back far enough to expose the thimble 32 on the end of the conductor. This step is made possible by the fact that the internal diameter of the tube 49 is made somewhat larger than the external diameter of the bushing 43, the lead sheath 31 of the cable and their union.

The cable ends are then aligned, with the conductor ends adjacent each other, and the split collar 33 is applied to connect the cable conductors as previously described. The insulating sleeve then is moved along the cable until it overlies the conductor joint, and the metallic member 48 in its inner wall makes electrical contact with the spring 47 on the split collar 33. The closure then may be removed from the opening 39 in the bushing 36, and if the oil pipe 26 is to be used it may then be connected, the pipe conveniently extending along the cable sheath away from the end of the cable. The shells 17 and 18 then are moved together to enclose the joint and insulating sleeve, and the wiped joints 19, 20 and 21 are made, the oil pipes 25 and 26 conveniently being included in the joints 20 and 21. The joint has now been enclosed within a fluid tight casing, and may be treated and filled with insulating material through the openings 22, 23 and 24, the plug 46 being removed from the bushing 43 through the opening 22 before sealing up the joint.

The invention provides improved means for preventing electrical breakdown between conductors having a high difference of potential. The exemplary insulating sleeve constructed in accordance with this invention provides a means for jointing electric cables which may operate at very high voltages without danger of breakdown in the joint. Furthermore, a cable joint is provided which is small in size, and which may be quickly and accurately installed in the field. If desired, insulating fluid may be fed separately to each element of the cable joint installation, for example to the cable length 15, the cable length 16, the insulating sleeve, and the joint casing, and if desired the insulating fluid supplied to each element may be maintained at any predetermined pressure.

While the invention has been specifically described with reference to a cable installation, and in so doing a particular cable construction has been disclosed, it will be understood that the invention may be variously modified and embodied, and is to be limited only by the scope of the appended claims.

I claim:

1. A joint for sheathed high-tension cables comprising a casing, two cable lengths bared of their sheaths adjacent their ends and having their conductors joined within the casing, the casing being united at its ends with the sheaths of the cable lengths, insulating means for said cable joint comprising a sleeve surrounding the joined cable ends within said casing and formed from a strip of insulating material wrapped in an overlying spiral, means providing a plurality of narrow conducting surfaces extending from the inner end longitudinally along said strip of insulating material and forming in the sleeve a plurality of spirally-wrapped, flaring screens surrounding and spaced along the joined cable ends, and means providing a plurality of wider conducting surfaces spaced longitudinally along said strip of insulating material and forming in the sleeve a plurality of co-axial, substantially cylindrical plates severally connecting corresponding flaring screens in the two halves of the sleeve, the screens and plates being proportioned and arranged in accordance with a predetermined plan for distributing electrical stress uniformly by zones longitudinally along the unsheathed portions of the joined cable ends within said sleeve to prevent electrical breakdown.

2. A joint for sheathed high-tension cables comprising a casing, two cable lengths bared of their sheaths adjacent their ends and having their conductors joined within the casing, the casing being united at its ends with the sheaths of the cable lengths, insulating means for said cable joint comprising a sleeve surrounding the joined cable ends within said casing and formed from a strip of insulating material wrapped in an overlying spiral, means providing a plurality of narrow conducting surfaces intercalated in said insulating sleeve and forming a plurality of spirally-wrapped, conducting screens surrounding the joined cable ends and spaced along the inner surface of said sleeve, and means providing a plurality of additional conducting surfaces intercalated in said insulating sleeve and electrically connected to said conducting screens for altering the inherent capacitances between the screens in accordance with a predetermined plan to distribute electrical stress substantially uniformly by zones longitudinally along the unsheathed portions of the cable ends within said sleeve.

3. A joint for sheathed high-tension cables comprising a casing, two cable lengths bared of their sheaths adjacent their ends and having their conductors joined within the casing, the casing being united at its ends with the sheaths of the cable lengths, insulating means for said cable joint comprising a sleeve surrounding the joined cable ends within said casing and formed from an overlying spiral wrapping of insulating material, and a plurality of strips of metallic foil intercalated in said wrapping of insulating material and forming a plurality of conducting screens surrounding the unsheathed portions of each cable end and spaced along the inner surface of said sleeve, and means for fixing the capacitances between said screens in accordance with a predetermined plan to distribute electrical stress by zones longitudinally along the inner surface of said sleeve and along the unsheathed portions of the joined cable ends.

4. A joint for sheathed high-tension cables comprising a casing, two cable lengths bared of their sheaths adjacent their ends and having their conductors joined within the casing, the casing being united at its ends with the sheaths of the cable lengths, and means for establishing zones of predetermined differences of potential along the unsheathed portions of the cable lengths within said casing and between the conductor joint and the ends of the sheaths, comprising a plurality of conducting screens surrounding and spaced along the unsheathed portions of the cables, said conducting screens adjacent the ends of the cable sheaths being separated by intervals longitudinally of the cable less than their widths longitudinally of the cable and also less than the radial thickness of the cable insulation, said conducting screens adjacent the conductor joint being narrower than the screens adjacent the ends of the cable sheaths, a plurality of substantially cylindrical conducting plates arranged co-axially around the conductor joint, and conducting means severally connecting said plates to corresponding conducting screens surrounding the two cable ends.

5. A joint for sheathed high-tension cables comprising a casing, two cable lengths bared of their sheaths adjacent their ends and having their conductors joined within the casing, the casing being united at its ends with the sheaths of the cable lengths, and means for establishing zones of predetermined differences of potential along the unsheathed portions of the cable lengths within said casing and between the conductor joint and the ends of the sheaths, comprising a plurality of conducting screens surrounding and spaced along the unsheathed portions of the cables and flaring outwardly toward the cable ends, said conducting screens adjacent the ends of the cable sheaths being separated by intervals longitudinally of the cable less than their width longitudinally of the cable and also less than the radial thickness of the cable insulation, a plurality of substantially cylindrical conducting plates arranged co-axially around the conductor joint, and conducting means severally connecting said plates to corresponding conducting screens surrounding the two cable ends.

6. A joint for sheathed high-tension cables comprising a casing, two cable lengths bared of their sheaths adjacent their ends and having their conductors joined within the casing, the casing being united at its ends with the sheaths of the cable lengths, and means for establishing zones of predetermined differences of potential along the unsheathed portions of the cable lengths within said casing and between the conductor joint and the ends of the sheaths, comprising a plurality of conducting screens surrounding and spaced along the unsheathed portions of the cables, said conducting screens adjacent the ends of the cable sheaths being separated by intervals longitudinally of the cable less than the radial thickness of the cable insulation, said conducting screens adjacent the conductor joint being narrower than the screens adjacent the ends of the cable sheaths, a plurality of substantially cylindrical conducting plates arranged co-axially around the conductor joint, and conducting means severally connecting said plates to corresponding conducting screens surrounding the two cable ends.

7. A joint for sheathed high-tension cables comprising a casing, two cable lengths bared of their sheaths adjacent their ends and having their conductors joined within the casing, the casing being united at its ends with the sheaths of the cable lengths, and means for establishing zones of predetermined differences of potential along the unsheathed portions of the cable lengths within said casing and between the conductor joint and the ends of the sheaths, comprising a plurality of flaring conducting screens surrounding and spaced along the unsheathed portions of the cables, said conducting screens adjacent the ends of the cable sheaths being separated by intervals longitudinally of the cable less than their widths longitudinally of the cable, a plurality of conducting shells arranged co-axially around the conductor joint, and conducting means severally connecting said shells to corresponding conducting screens surrounding the two cable ends.

8. A joint for sheathed high-tension cables comprising a casing, two cable lengths bared of their sheaths adjacent their ends to expose the cable insulation, and having their conductors joined within the casing, the casing being united at its ends with the sheaths of the cable lengths, a plurality of conducting screens surrounding and spaced longitudinally along the exposed insulation of each cable end, said screens surrounding each cable end flaring outwardly toward the conductor joint, and common means for establishing predetermined differences of potential between corresponding adjacent flaring screens on the two cable ends to distribute electrical stress by zones longitudinally along the unsheathed portions of the cable ends and prevent electrical breakdown.

9. A joint for sheathed high-tension cables comprising a casing, two cable lengths bared of their sheaths adjacent their ends to expose the cable insulation, and having their conductors joined within the casing, the casing being united at its ends with the sheaths of the cable lengths, a plurality of conducting screens surrounding and spaced longitudinally along the exposed insulation of each cable end, said screens surrounding each cable end flaring outwardly toward the conductor joint, the angles of flare of said screens relative to the cable increasing from the end of the cable sheath toward the joined conductors, and means for establishing predetermined differences of potential between adjacent flaring screens on the two cable ends to distribute electrical stress by zones longitudinally along the unsheathed portions of the cable ends and prevent electrical breakdown.

10. A joint for sheathed high-tension cables comprising a casing, two cable lengths bared of their sheaths adjacent their ends and having their conductors joined within the casing, the casing being united at its ends with the sheaths of the cable lengths, insulating and stress-distributing means for said cable joint comprising an insulating sleeve surrounding the joined cable ends within said casing, a plurality of nested conducting shells incorporated in said insulating sleeve, each shell having reduced end portions and forming a substantially continuous electrostatic shield surrounding the conductor joint and extending substantially between the exposed insulation surfaces of the two cables.

11. A joint for sheathed high-tension cables comprising a casing, two cable lengths bared of their sheaths adjacent their ends and having their conductors joined within the casing, the casing being united at its ends with the sheaths of the cable lengths, an insulating sleeve surrounding the joined cable ends within said casing, said insulating sleeve being enclosed within an oil-tight jacket within and additional to said casing, and means for supplying oil under pressure to said jacket, whereby the pressure within said jacket may be maintained independently of any pressure within said casing and surrounding the jacketed insulating sleeve.

12. A joint for sheathed, oil-filled cables comprising a casing, two cable lengths bared of their sheaths adjacent their ends and having their conductors joined within the casing, the casing being united at its ends with the sheaths of the cable lengths, an oil cap enclosing a cable end within said casing and joined fluid tight to the sheath and conductor of the cable so as to prevent exchange of oil between the cable length and the joint casing, an oil passageway through said cap, and a pipe connected with said oil passageway and extending exteriorly of the casing through the union between the cable sheath and one end of the casing, whereby oil may be supplied under pressure direct to the capped cable end independently of any pressure within said casing and surrounding the capped cable end.

13. In a high-voltage cable installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath, including a plurality of flaring conducting screens surrounding and spaced along the exposed surface of the cable insulation, the screens adjacent the end of the sheath severally being wider longitudinally of the cable than the adjacent spacing intervals between conducting screens, and a plurality of concentric, substantially cylindrical shells of conducting material surrounding the cable end and connected severally to said screens for altering the inherent electrical capacities between the screens.

14. In a high-voltage cable installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath, including a plurality of flaring conducting screens surrounding the exposed surface of the cable insulation and insulated electrically one from another, the intervals between screens adjacent the end of the sheath severally being narrower longitudinally of the cable than the thickness of the conductor insulation, and a plurality of cylindrical conducting shells co-axially surrounding the cable end and connected severally to said screens for altering the inherent electrical capacities between the screens.

15. In a high-voltage cable installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath, including a plurality of conducting screens surrounding and spaced along the exposed surface of the insulation and flaring outwardly toward the end of the cable, and a plurality of cylindrical conducting shells co-axially surrounding the cable end and connected severally to said flaring screens for altering the inherent electrical capacities between the screens.

16. In a high-voltage cabel installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath, including a plurality of concentric conducting shells coaxially surrounding the cable end, said shells being capacitatively associated directly with the cable conductor and overlapping one another longitudinally of the cable by amounts which alter the inherent electrical capacitances between the shells in accordance with a predetermined plan for producing substantially uniform stress distribution longitudinally along the exposed cable insulation.

17. In a high-voltage cable installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath, including a plurality of conducting screens surrounding and spaced along the exposed surface of the insulation and flaring outwardly toward the end of the cable, the angles of flare of said screens relative to the cable increasing from the end of the cable sheath toward the end of the cable, and means connected to said flaring screens for altering the inherent electrical capacities between the screens.

18. In a high-voltage cable installation, the combination of a cable length comprising an insulated and sheathed conductor from which the sheath has been removed adjacent one end to expose the cable insulation, means for distributing electrical stress longitudinally along the surface of the exposed cable insulation to prevent breakdown between the conductor and the sheath, including a plurality of conducting screens surrounding and spaced along the exposed surface of the cable insulation, and flaring outwardly toward the cable end, the angle of flare of said screens relative to the cable increasing and the width of the screens longitudinally of the cable decreasing progressively from the end of the cable sheath toward the exposed cable conductor.

19. In a high-voltage cable installation, the combination of a cable length comprising an insulated and sheathed conductor from which the sheath has been removed adjacent one end to expose the cable insulation, means for distributing electrical stress longitudinally along the surface of the exposed cable insulation to prevent breakdown between the conductor and the sheath, including a plurality of conducting screens surrounding and spaced along the exposed surface of the cable insulation, and flaring outwardly toward the cable end, the angle of flare of said screens relative to the cable increasing from the end of the cable sheath toward the exposed cable conductor.

20. In a high-voltage cable installation, the combination of a cable length comprising an insulated and sheathed conductor from which the sheath has been removed adjacent one end to expose the cable insulation, means for distributing electrical stress longitudinally along the surface of the exposed cable insulation to prevent breakdown between the conductor and the sheath, including a plurality of conducting screens surrounding and spaced along the exposed surface of the cable insulation and flaring outwardly toward the cable end, the width of the screens longitudinally of the cable decreasing from the end of the cable sheath toward the exposed cable conductor.

21. In a high-voltage cable installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath comprising a plurality of conducting members surrounding and spaced along the exposed surface of the insulation and flaring outwardly toward the end of the cable, each flaring conducting member being capacitatively associated with the cable conductor and with the next adjacent flaring conducting member, said flaring members overlapping one another longitudinally of the cable for altering the inherent electrical capacitances between the members in accordance with a predetermined plan which produces the desired stress distribution along the exposed cable insulation.

22. An article of manufacture comprising an insulating sleeve adapted to surround a high tension conductor, and formed from an overlying, spirally-wrapped strip of insulating material, a plurality of narrow strips of conducting material spaced from each other transversely of said strip of insulatng material and intercalated during the formation of the sleeve to form a plurality of spiralled conducting screens spaced longitudinally along the inner surface of the sleeve, a plurality of wider strips of conducting material spaced from each other longitudinally of said strip of insulating materal and intercalated during the formation of the sleeve to form a plurality of substantially cylindrical conducting shells and means electrically connecting said screens and shells for altering the inherent electrical capacities between the screens in accordance with a predetermined plan.

23. An article of manufacture comprising an insulating sleeve adapted to surround a high tension conductor, and formed from an overlying, spirally wrapped strip. of insulating material, means intercalated in said sleeve during the wrapping operation and providing a plurality of conducting screens spaced longitudinally along the inner surface of the sleeve, and other means intercalated in said sleeve during the wrapping operation and connected to said screens for altering the inherent electrical capacitances between the screens in accordance with a predetermined plan.

24. An article of manufacture comprising an insulating sleeve adapted to surround a high tension conductor, and formed from an overlying, spirally-wrapped strip of insulating material, means intercalated in said sleeve during the wrapping operation and providing a plurality of conducting screens spaced longitudinally along the inner surface of the sleeve, other means intercalated in said sleeve during the wrapping operation and providing connections for altering the inherent electrical capacitances between the screens in accordance with a predetermined plan, said insulating sleeve being enclosed within an oil-tight jacket forming a part thereof, and connections to said jacket whereby oil may be supplied under pressure to said jacket to maintain the integrity of its insulating properties.

25. An article of manufacture comprising an insulating sleeve adapted to surround a high tension conductor, and formed from an impervious tube of insulating material and an overlying, spirally-wrapped strip of pervious insulating material, electrically conducting means intercalated in said spirally-wrapped strip of insulating material for distributing electrical stress longitudinally of said sleeve, an impervious wall enclosing said pervious insulating material and joined fluid tight to the ends of said tube, and connections to said sleeve whereby oil may be supplied under pressure to the pervious insulating material.

26. An article of manufacture comprising an insulating sleeve adapted to surround a high tension conductor, conducting surfaces in said sleeve providing a plurality of conducting screens spaced longitudinally along the inner surface of the sleeve, and other conducting surfaces in said sleeve connected electrically to said screens for altering the inherent electrical capacitances between the screens in accordance with a predetermined plan.

27. An article of manufacture comprising an insulating sleeve adapted to surround joined high tension conductors, a plurality of nested conducting shells incorporated in said insulating sleeve, each shell forming a substantially continuous electrostatic shield and having reduced end portions forming flaring screens spaced longitudinally along the inner surface of said sleeve.

28. A joint for sheathed high-tension cables comprising a casing, two cable lengths bared of their sheaths adjacent their ends and having their conductors joined within the casing, the casing being united at its ends with the sheaths of the cable lengths, an insulating sleeve surrounding the joined cable ends within said casing, said insulating sleeve being enclosed within an oil-tight jacket within and additional to said casing, a body of oil within said jacket filling substantially all voids within and surrounding said insulating sleeve, and a separate body of oil under pressure filling said casing and surrounding said jacket.

29. A joint for sheathed, oil-filled cables comprising a casing, two cable lengths bared of their sheaths adjacent their ends and having their conductors joined within the casing, the casing being united at its ends with the sheaths of the cable lengths, an oil cap enclosing a cable end within said casing and joined fluid tight to the sheath and conductor of the cable so as to prevent exchange of oil between the cable length and the joint casing, an oil passageway through said cap, a pipe connected with said oil passageway and extending exteriorly of the casing through an opening therein, and means forming an oil-tight union between said pipe and the casing wall, whereby oil may be supplied under pressure direct to the capped cable end independently of any pressure within said casing and surrounding the capped cable end.

30. In a high-voltage cable installation, the combination of a cable length comprising an insulated and sheathed conductor from which the sheath has been removed adjacent one end to expose the cable insulation, means for distributing electrical stress by zones longitudinally along the surface of the exposed cable insulation to prevent breakdown between the conductor and the sheath, including a plurality of conducting screens surrounding and spaced along the exposed surface of the cable insulation, the screens flaring outwardly toward the cable end and having angles of flare relative to the conductor whose tangents are substantially equal to $$\frac{R\left[\left(\frac{R}{r}\right)^{\frac{v}{V-v}}-1\right]}{y},$$

where, for any screen, R represents the smallest radius of the screen, $r$ the radius of the cable conductor, V the difference in potential between the screen and the cable conductor, $v$ the difference in potential between the screen and a point P under the screen on the radius R, and $y$ the distance of the point P longitudinally of the cable from the screen.

31. The method of saturating a sleeve of porous insulating material having incorporated therein a plurality of substantially cylindrical conducting shells with a liquid insulating material, which method comprises enclosing the sleeve in a casing, effecting a circumferential, fluid tight joint between one of the conducting shells and the wall of the casing to prevent direct flow of the saturant longitudinally along the outer surface of the sleeve, and forcing saturant from end to end through the sleeve inside of the shell joined to the casing.

32. The method of saturating a sleeve of porous insulating material having incorporated therein a plurality of coaxial cylindrical conducting shells with a liquid insulating material, which method comprises effecting a circumferential, fluid tight joint with one of the conducting shells to prevent direct flow of the saturant longitudinally along the outer surface of the sleeve, and forcing saturant from end to end through the sleeve inside of the shell to which the joint is made.

33. An article of manufacture comprising a sleeve of porous insulating material adapted to surround a high tension conductor and having incorporated therein a plurality of substantially cylindrical conducting shells, an outer casing enclosing said sleeve, and a substantially fluid tight circumferential connection between one of said conducting shells and the enclosing casing to prevent the passage of fluid longitudinally of said sleeve between the sleeve and the outer casing.

34. An article of manufacture comprising a sleeve of porous insulating material adapted to surround a high tension conductor, a cylindrical shell of impervious material incorporated in said sleeve, an outer casing encircling said sleeve, and a fluid tight circumferential connection between the said impervious shell and the enclosing casing to prevent the passage of fluid longitudinally of said sleeve between the impervious shell and the outer casing.

RALPH W. ATKINSON.